(12) United States Patent
Nakamura

(10) Patent No.: US 12,299,734 B2
(45) Date of Patent: May 13, 2025

(54) ELECTRONIC APPARATUS, DISPLAY METHOD, AND PROGRAM

(71) Applicant: TRYGLE CO., LTD., Tokyo (JP)

(72) Inventor: Daisuke Nakamura, Tokyo (JP)

(73) Assignee: TRYGLE CO., LTD., Tokyo (JP)

( * ) Notice: Subject to any disclaimer, the term of this patent is extended or adjusted under 35 U.S.C. 154(b) by 0 days.

(21) Appl. No.: 18/173,223

(22) Filed: Feb. 23, 2023

(65) Prior Publication Data

US 2023/0274338 A1     Aug. 31, 2023

Related U.S. Application Data

(63) Continuation of application No. 16/319,200, filed as application No. PCT/JP2017/022125 on Jun. 15, 2017, now Pat. No. 11,625,766.

(30) Foreign Application Priority Data

Jul. 27, 2016  (JP) ................................. 2016-147137

(51) Int. Cl.
  *G06Q 30/0601*   (2023.01)
  *G06F 3/0482*    (2013.01)
  *G06F 3/0483*    (2013.01)

(52) U.S. Cl.
  CPC ....... *G06Q 30/0641* (2013.01); *G06F 3/0482* (2013.01); *G06F 3/0483* (2013.01); *G06Q 30/0631* (2013.01); *G06Q 30/0633* (2013.01)

(58) Field of Classification Search
  CPC ........... G06Q 30/0641; G06Q 30/0631; G06Q 30/0633; G06Q 30/0601–0645; G06F 3/0482; G06F 3/0483

(Continued)

(56) References Cited

U.S. PATENT DOCUMENTS 8,195,529 B1*   6/2012   Cohen ................ G06Q 30/0601
                                                        705/26.1
2011/0093374 A1*   4/2011   Messina ................ G06F 3/0481
                                                        705/37

(Continued)

FOREIGN PATENT DOCUMENTS

CN         102609860 A    7/2012
CN         105630299 A    6/2016

(Continued)

OTHER PUBLICATIONS

Jason Fitzpatrick, Five Best Wishlist Tools, Lifehacker, Nov. 29, 2009 (Year: 2009).*

(Continued)

*Primary Examiner* — Marissa Thein
*Assistant Examiner* — Anna Mae Mitros
(74) *Attorney, Agent, or Firm* — ALSTON & BIRD LLP

(57) ABSTRACT

Because an electronic apparatus includes: an input means; and a display means for, when a first product registered in a first classification is newly registered in a second classification on the basis of an operational instruction via the input means from a user, displaying a first image in which information about the first product is included, and a second image in which information about the first product is added, and for, when a second product registered in the second classification is newly registered in a third classification, displaying the second image in which information about the second product is deleted, and a third image in which information about the second product is added, the electronic apparatus provides a purchase management function of properly displaying a state of each product and making it easy for the user to perform management in accordance with the classifications.

20 Claims, 15 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 2013/0117151 A1* | 5/2013 | Macaisa ................. | G06Q 50/01 705/26.8 |
| 2014/0046794 A1* | 2/2014 | Vallery .............. | G06Q 30/0631 705/26.7 |
| 2014/0279197 A1* | 9/2014 | Ainsworth, III ... | G06Q 30/0631 705/26.7 |
| 2015/0120417 A1* | 4/2015 | Kim .................. | G06Q 30/0641 705/14.23 |
| 2015/0154686 A1* | 6/2015 | Lawrence .......... | G06Q 30/0641 705/26.8 |
| 2016/0026751 A1 | 1/2016 | Walther | |
| 2016/0328727 A1 | 11/2016 | Szulczewski et al. | |

FOREIGN PATENT DOCUMENTS

| | | |
|---|---|---|
| JP | 2003-058570 A | 2/2003 |
| JP | 2006-031655 A | 2/2006 |
| JP | 2013-206414 A | 10/2013 |
| JP | 2013-250750 A | 12/2013 |
| JP | 2016-004512 A | 1/2016 |
| KR | 10-2010-0007694 A | 1/2010 |
| KR | 10-2013-0142226 A | 12/2013 |
| KR | 10-2014-0066893 A | 6/2014 |
| KR | 10-2016-0064416 A | 6/2016 |
| WO | 2013/180188 A1 | 12/2013 |

OTHER PUBLICATIONS

U.S. Appl. No. 16/319,200, filed Jan. 18, 2019, U.S. Pat. No. 11,625,766.
Alexandra Leshner, These 6 Websites Will Consolidate & Organize Your Wedding Registries, Philadelphia, Mar. 19, 2015 (Year: 2015).
China Office Action issued Feb. 28, 2022 for China Application No. 201780044856.0 with English translation.
Chinese Office Action and Search Report for Chinese Application No. 201780044856.0 dated Apr. 26, 2021, with English translation.
Hikaru Tashimo, "Mac Kiso Koza Stage3 Benrina Web Service [Amazon]", Mac People, Jan. 29, 2013, vol. 19, No. 3, pp. 222 to 225.
Indian Office Action for Indian Application No. 201947000786, dated Apr. 21, 2021, with English translation.
International Preliminary Report on Patentability received for PCT Patent Application No. PCT/JP2017/022125, mailed on Feb. 7, 2019, 13 pages (9 pages of English Translation and 4 pages of Original Document).
International Search Report and Written Opinion received for PCT Patent Application No. PCT/JP2017/022125, mailed on Jul. 18, 2017, 13 pages (7 pages of English Translation and 6 pages of Original Document).
Japanese Office Action dated Jan. 30, 2018 in Japanese Patent Application No. 2016-147137 with English Translation.
Korean Office Action, dated Jul. 23, 2020, for Korean Application No. 10-2019-7001910, with an English machine translation.
Office Action issued Jan. 26, 2021 in corresponding Korean Patent Application No. 2019-7001910.

* cited by examiner

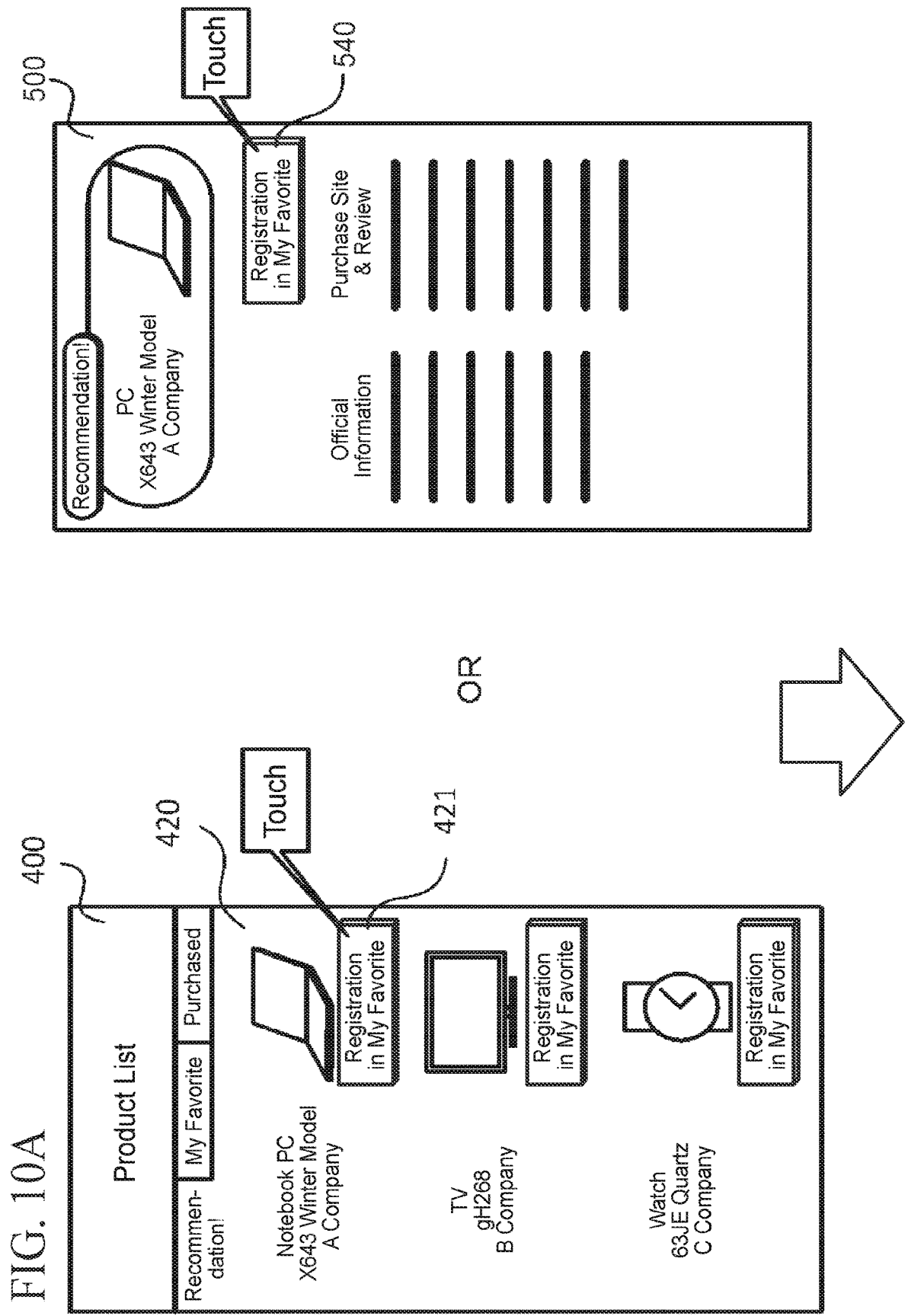

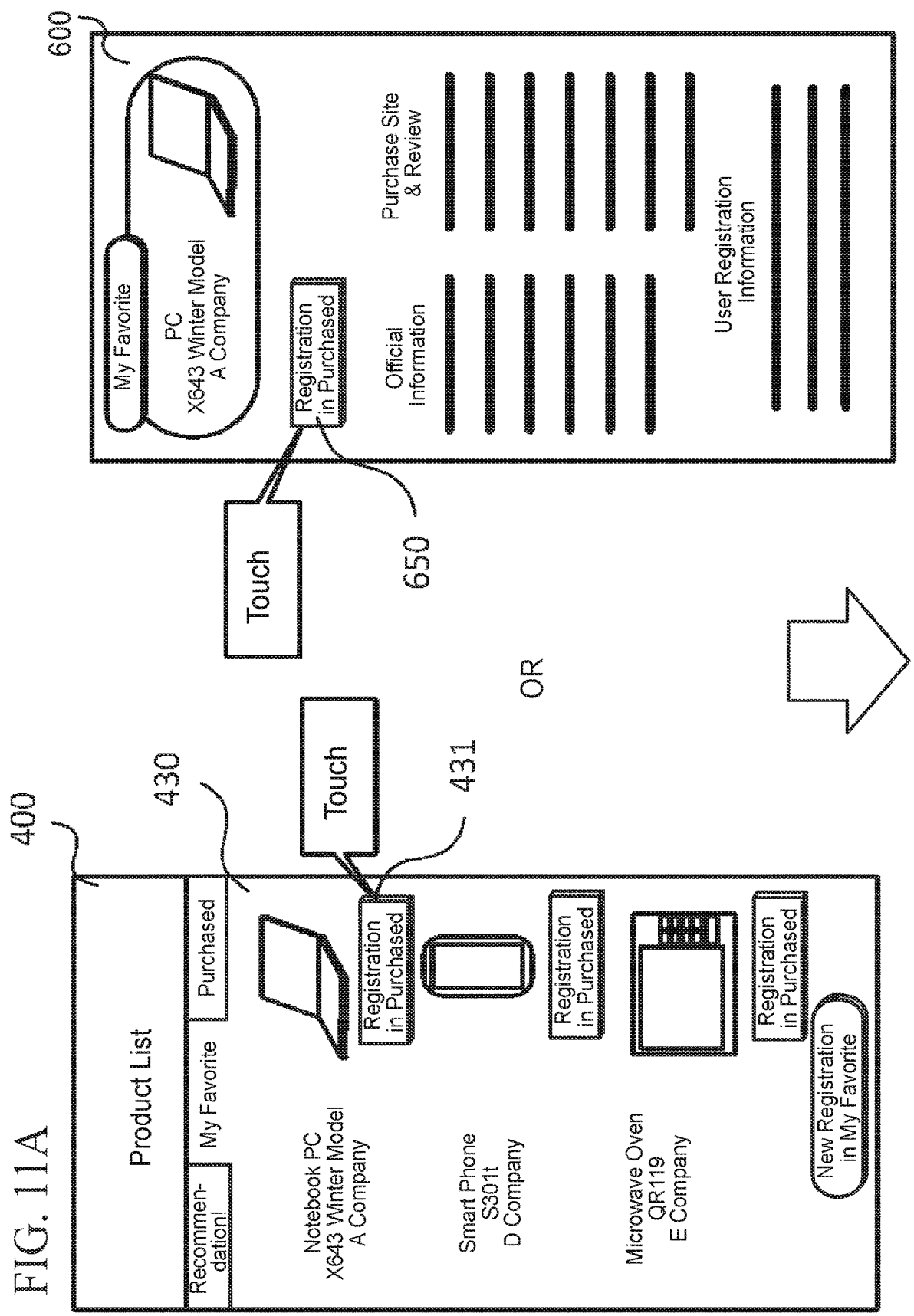

ELECTRONIC APPARATUS, DISPLAY METHOD, AND PROGRAM

CROSS-REFERENCE TO RELATED APPLICATIONS

This application is a continuation of and claims priority to U.S. patent application Ser. No. 16/319,200, filed Jan. 18, 2019, which is a National Stage Entry of PCT Application No. PCT/JP2017/022125, filed Jun. 15, 2017, which claims priority to Japan Application No. 2016-147137, filed Jul. 27, 2016, the contents of each of which are incorporated herein by reference in their entirety.

TECHNICAL FIELD

The present invention relates to an electronic apparatus, a display method, and a program that make it easy for a user to perform purchase management of products.

BACKGROUND ART

Informatization in recent years has enabled users to easily purchase products and perform the management of purchase of products via a network, and the installation of a function that allows a user to assist the purchase of a product with an electronic apparatus such as a smart phone has been studied.

For example, a technique for, when a user desires to purchase a product at a predetermined shop, causing an electronic apparatus to store the shop in advance, and, when the user comes to an area near the shop, assisting the user to purchase the product by presenting information about that shop to the user is disclosed (see Patent Literature 1).

CITATION LIST

Patent Literature

Patent Literature 1: Japanese Unexamined Patent Application Publication No. 2003-58570

SUMMARY OF INVENTION

Technical Problem

Further, an apparatus and an application for management of purchase of products have been also studied, and there is a case in which, in the apparatus and an application for management of purchase of products, a user's management of purchase of products is assisted by providing a function of managing information about a product which the user desires to purchase and a function of managing information about a product which the user has purchased, a function of recommending a product which the user may purchase, or the like.

In such a case, because when these managing functions and the recommending function are implemented by completely individual applications, it is troublesome for the user to perform the management of each of the applications, the user's convenience can be improved by providing a comprehensive application.

However, there is a possibility that when products put in different categories, such as a product before purchase and a product after purchase, are mixedly displayed, the user becomes confused.

It is an object of the present invention to provide a purchase management function of properly displaying a state of each product and making it easy for the user to perform management in accordance with classifications.

Solution to Problem

In order to solve the above-mentioned problem and to attain the object, according to the present invention, there is provided an electronic apparatus including: an input means for receiving an operational instruction from a user; and a display means for selectively displaying a first image in which information about a product registered in a first classification by a server is displayed, a second image in which information about a product registered in a second classification by the user is displayed, or a third image in which information about a product registered in a third classification by the user is displayed, for, when a first product registered in the first classification is newly registered in the second classification on the basis of an operational instruction on the input means and from the user, displaying the first image in which information about the first product is included, and the second image in which information about the first product is added, and for, when a second product registered in the second classification is newly registered in the third classification, displaying the second image in which information about the second product is deleted, and the third image in which information about the second product is added.

Advantageous Effects of Invention

The present invention can provide a purchase management function of properly displaying a state of each product and making it easy for the user to perform management in accordance with the classifications.

BRIEF DESCRIPTION OF DRAWINGS

FIGS. 10A and 10B are views showing an example of screen switching according to Embodiment 1;

FIGS. 11A and 11B are views showing an example of the screen switching according to Embodiment 1;

DESCRIPTION OF EMBODIMENTS

Hereafter, embodiments of an electronic apparatus, a display method, and a program according to the present invention will be explained in detail on the basis of drawings.

Embodiment 1

Figure 1:
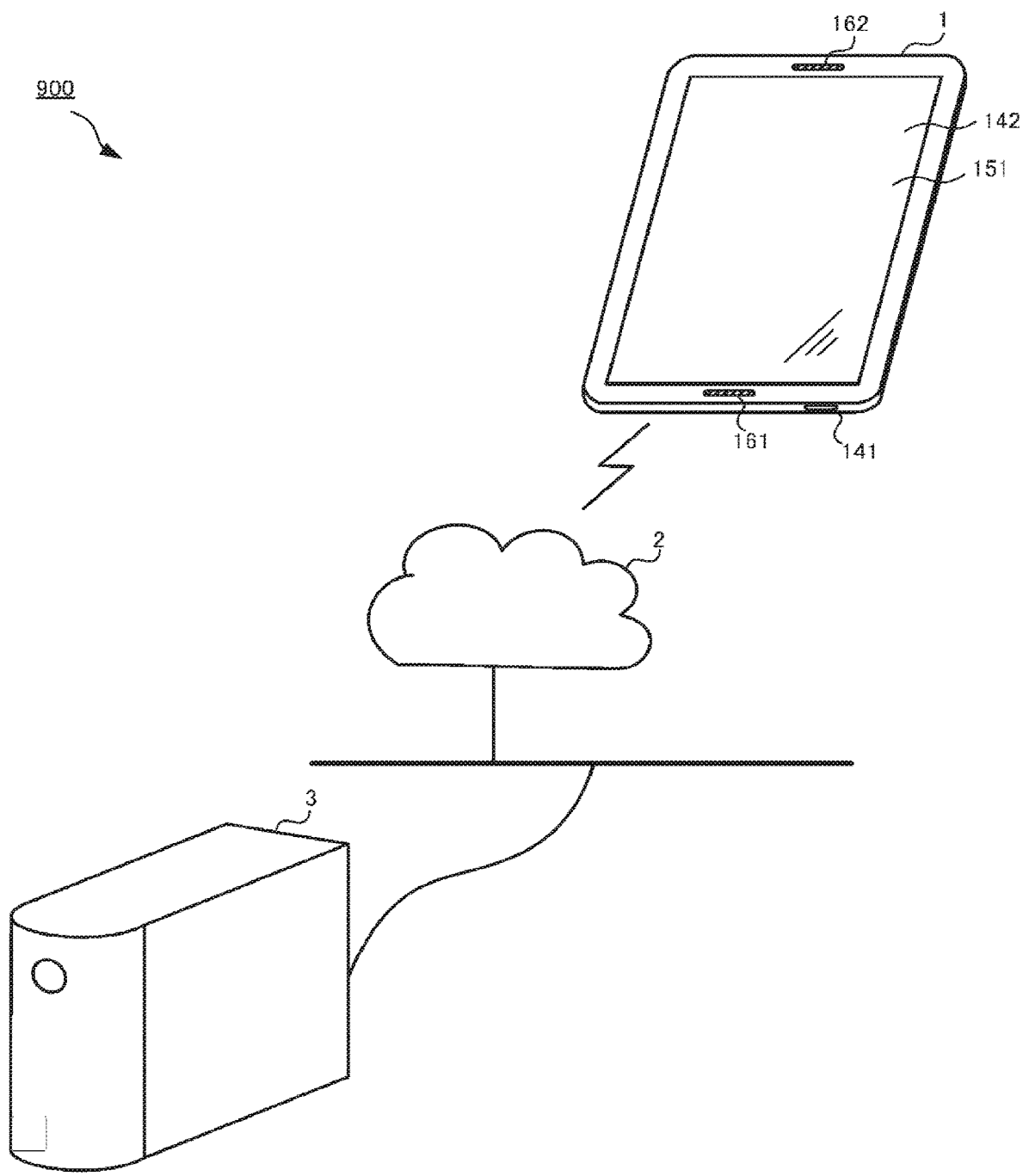
FIG. 1 is a view showing an example of a system configuration according to Embodiment 1.

FIG. 1 is a view showing an example of a system configuration in this embodiment.

A purchase management system 900 is shown in FIG. 1. The purchase management system 900 includes an electronic apparatus 1, the Internet 2, and a server 3.

The electronic apparatus 1 in this embodiment is, for example, a smart phone. The electronic apparatus 1 contains an antenna not-illustrated in FIG. 1, and, by using this antenna, can make a phone call with other telephone apparatuses and establish a communication connection to the Internet 2 via a mobile communication network, such as 3G (3rd Generation) or LTE (Long Term Evolution).

Although in this embodiment, an example of the electronic apparatus 1 is explained as a smart phone, this embodiment is not limited to this example, and there can be provided various examples including a desktop or laptop PC (Personal Computer), a tablet-type information processing device, a mobile phone which is not a smart phone, and electronic apparatus having a function of communicating with other external devices.

The electronic apparatus 1 has a display 151 that displays an image, and a touch panel 142 that is disposed so as to be superposed on the display 151 and that receives a touch input from a user.

Further, a hardware button (also referred to as an HW button hereafter) 141 is disposed in a part of a housing, and the user provides an operational instruction for the electronic apparatus 1 by using the HW button 141 and the touch panel 142 (the HW button 141 and the touch panel 142 function as an input unit).

The display 151 is a display device (display unit) that is disposed while being exposed from the housing of the electronic apparatus 1, and that is, for example, an LCD (Liquid Crystal Display) or an OELD (Organic Electroluminescence Display).

The touch panel 142 is, for example, a contact detecting device of capacitive sensing type and is disposed so as to be superposed on the display 151, while the touch panel causes an image displayed on the display 151 to be transmitted, thereby making it possible for the user to visually recognize the image.

In addition, a microphone 161 and a speaker 162 are disposed in the electronic apparatus 1. The microphone 161 is the one (sound collecting means) having a sound collecting function, and the speaker 162 functions as a sound output means having a function of outputting a sound.

A function for assisting the user's management of purchase of products is installed in the electronic apparatus 1, and the electronic apparatus 1 can provide the user with various functions by connecting to the server 3 via the Internet 2 and acquiring information.

The server 3 has pieces of information about products and information about each of users, and has a function of transmitting these pieces of information to each of client devices including the electronic apparatus 1 via the Internet 2. Although in this embodiment, for the sake of simplicity, an explanation will be made by taking, as an example, a case in which the server 3 exists as a single device, this embodiment is not limited to this example, and devices and a control unit in the server 3 or an internal database in the server 3 can be disposed while being distributed among multiple locations.

Next, the internal configuration of each apparatus of the purchase management system 900 will be explained by reference to FIG. 2.

Figure 2:
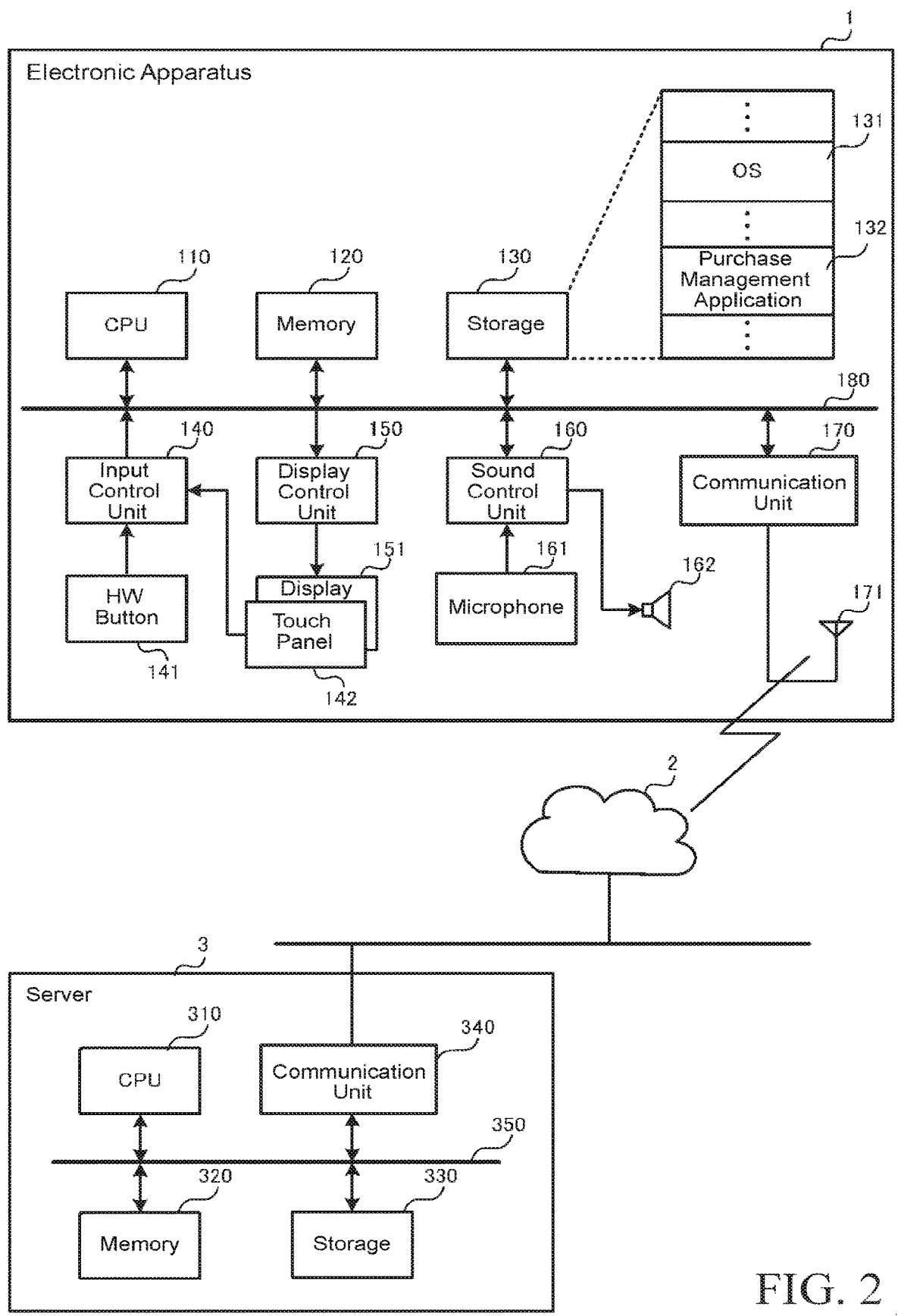
FIG. 2 is a schematic diagram showing an example of the internal configuration of each apparatus according to Embodiment 1.

FIG. 2 is a block diagram showing the internal configuration of each apparatus of the purchase management system 900 in this embodiment.

The electronic apparatus 1 has a CPU 110, a memory 120, a storage 130, an input control unit 140, the HW button 141, the touch panel 142, a display control unit 150, the display 151, a sound control unit 160, the microphone 161, the speaker 162, a communication unit 170, the antenna 171, and a bus 180.

The CPU 110 functions as a control means that controls the whole of the electronic apparatus 1. The CPU 110 has a function of acquiring a program which is an OS 131 or a purchase management application 132, the program being stored in the storage 130, developing the program in the memory 120, and performing a process defined by the OS 131 or the purchase management application 132. The CPU 110 is a central processing unit and has a function of processing information, and can be referred to using one of various designations such as circuitry, controller, and processor. Further, the CPU 110 does not have to be constituted of a single piece of circuitry, a single controller, or a single processor as hardware, and may be constituted of one or more pieces of circuitry, one or more controllers, or one or more processors.

The memory 120 is, for example, a volatile storage device (medium) referred to as a RAM (Random Access Memory), and is used as an area in which the program is developed when the CPU 110 executes each of various programs, or used as various caches and a buffer.

The storage 130 is, for example, a large-volume nonvolatile storage device (medium) such as an HDD (Hard Disk Drive) or an SSD (Solid State Disk), and stores various programs each of which is executed by the CPU 110. As programs stored in the storage 130, in this embodiment, the OS 131 and the purchase management application 132 are included.

The OS 131 is the program of the operating system having the function of controlling the whole of the electronic apparatus 1.

The purchase management application 132 is an application program for performing the management and information acquisition of a product which the user desires to purchase and a product which the user has purchased, and has various functions for the management and the information acquisition. This purchase management application 132 will be described later in detail.

The input control unit 140 is, for example, an interface circuit, and has a function of transmitting an operational input by the user via the HW button 141 or the touch panel 142 to the CPU 110. More specifically, the input control unit 140, the HW button 141, and the touch panel 142 function, as an input means, singularly or independently.

The display control unit 150 is, for example, a GPU (Graphic Processing Unit), and has a function of performing control in such a way as to display an image on the display 151 on the basis of an instruction from the CPU 110.

The sound control unit 160 is the one that performs control. The sound control unit 160 also includes a conversion circuit that performs analog to digital conversion on a sound signal of a sound collected by the microphone 161, and transmits the sound signal to the CPU 110, and a sound synthesizing circuit that performs analogue conversion on a sound signal outputted from the CPU 110, and amplifies and outputs this signal.

The communication unit 170 is a communication device (circuit) that performs communications with a mobile communication network, such as 3G or LTE, by using the antenna 171, and has a function of performing communications with the Internet 2 via this communication network. Although in this embodiment, an explanation will be made by taking, as an example, mobile communications, this embodiment is not limited to this example as a matter of course, and the communication unit 170 may perform communications compliant with another communication standard, for example, a wireless LAN (Local Area Network) or the like.

The bus 180 has a function of connecting components connected thereto in such a way that the components can communicate with each other.

The server 3 has a CPU 310, a memory 320, a storage 330, a communication unit 340, and a bus 350.

The CPU 310 is a processor that functions as a control means for controlling the whole of the server 3. Further, a function of providing or updating information stored in the storage 330 on the basis of various requests from clients including the electronic apparatus 1 is included.

The memory 320 is, for example, a volatile storage device (medium) referred to as a RAM, and is used as an area in which the program is developed when the CPU 310 executes each of various programs, or used as various caches and a buffer.

The storage 330 is, for example, a large-volume nonvolatile storage device (medium), such as an HDD or an SSD, and stores a DB (Data Base) in which various programs each of which is executed by the CPU 310 and various pieces of information in the purchase management system 900 are stored. This DB will be explained later in detail by using FIG. 3.

The communication unit 340 is a transmitter-receiver or a communication interface circuit and is connected to the Internet 2 via, for example, a LAN or the like, and can perform communications with a client apparatus including the electronic apparatus 1 via the Internet 2.

The bus 350 has a function of connecting components connected thereto in such a way that the components can communicate with each other.

Next, a configuration for implementing the function which is provided for the user by the purchase management system 900 will be explained in detail.

Figure 3:
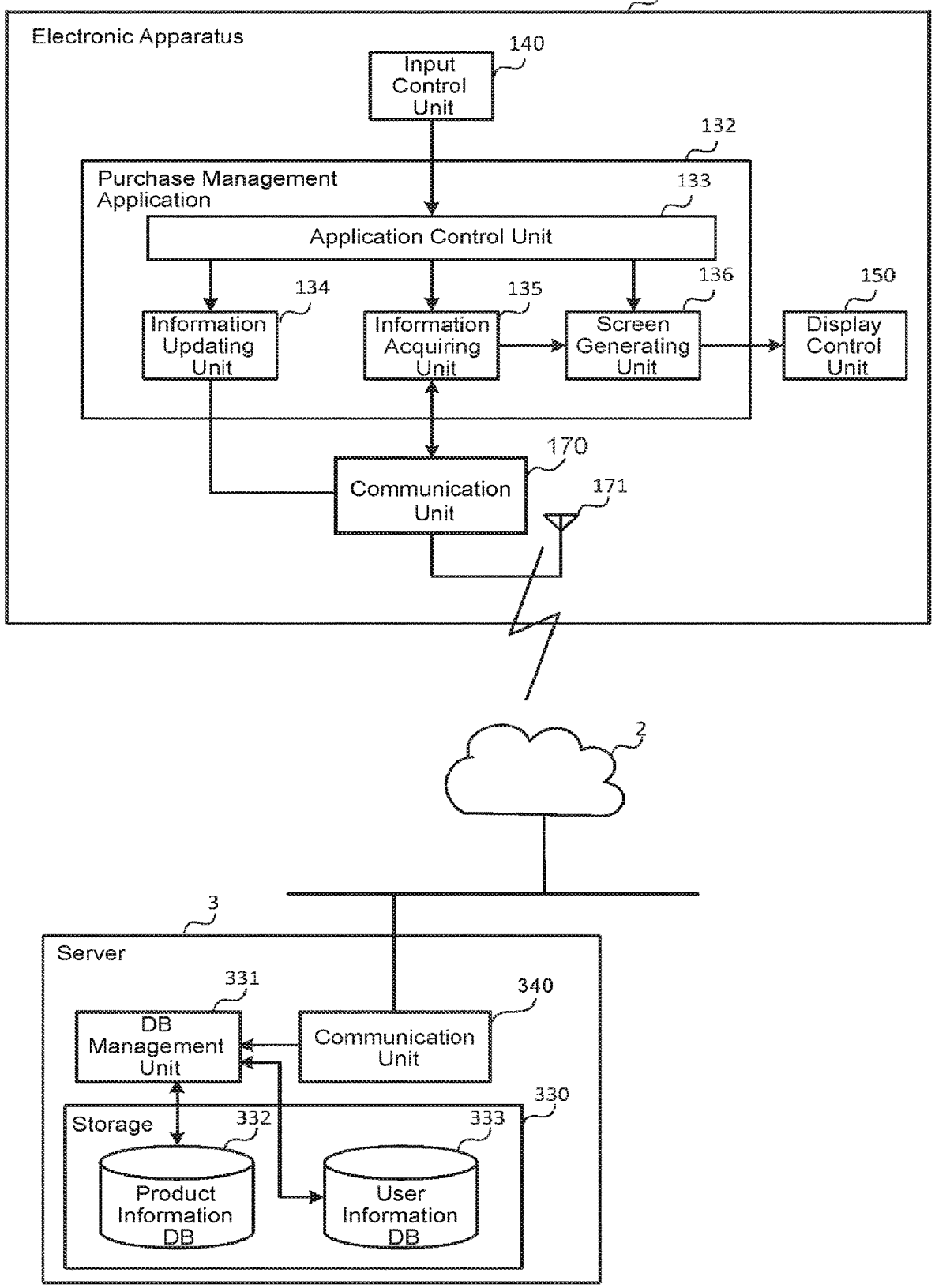
FIG. 3 is a schematic diagram showing an example of a functional configuration for providing a user with a purchase management function according to Embodiment 1.

FIG. 3 is a schematic diagram showing an example of the functional configuration for providing the user with the purchase management function in this embodiment.

The purchase management application 132 provides the function of performing the management of purchase of products, in cooperation with the server 3. For example, official information from a manufacturer, including specifications and an operation manual about each of various products, information about a purchase site from which the product can be purchased, and information making it possible to know review information about the product can be displayed and provided for the user. Further, by separately (selectively) displaying information about a product recommended to the user, information about a product which the user has registered as a product under purchase consideration as the user's favorite, or information about a product which the user has purchased, the user can grasp (manage) states of the products without getting confused about purchase consideration states (categories, classifications, steps, phases, and stages) of the products.

These pieces of information about products for providing the function, and information about the user are stored in the server 3. A product information DB (Data Base) 332 and a user information DB 333 which are databases of these pieces of information are stored in the storage 330 of the server 3.

Information about each product registered by an application providing dealer or a database providing dealer is stored in the product information DB 332. Official information and purchase site & review information are stored in the product information DB 332 while the official information and the purchase site & review information are associated with each product.

The official information refers to, for example, product specification information, information about an operation manual, information about the official site of the manufacturer or a sales agency of the product, FAQ (Frequently Asked Questions) information, information about contact for repair request, inquiry form/telephone number information, and information about a related cloud service (e.g., an official image sharing site of the manufacturer of a digital camera).

Further, the purchase site & review information refers to information which is not information officially provided by a provider of the product, for example, information about a purchase site from which the product can be purchased, information about a site in which a review about the product can be viewed, information about a moving image site in which a moving image about the product can be viewed, information about a review report site, information about a price comparison site, and information about an SNS (Social Networking Service), a blog, or hashtag invoking in an SNS.

Each of these pieces of information can be the one which is defined in, for example, HTML (HyperText Markup Language) or the like and which can be directly provided as an image for the user, or the one showing, for example, the URL (Uniform Resource Locator) of a site. Further, each of the pieces of information can be manually inputted by, for example, the provider of this system by using an information apparatus not-illustrated, or can be spontaneously or appropriately inputted by using, for example, artificial intelligence.

In the user information DB 333, information about each user registered in the purchase management system 900 is stored. Here, the information about each user includes, for example, information about the user himself/herself, such as the user's name and age, and pieces of information in which the user is associated with products, such as information about a product which the user has registered in the user's favorite, and information about a product which the user has purchased.

A DB management unit 331 has a function of managing the product information DB 332 and the user information DB 333, and has a function of updating each of the DBs or providing information in each of the DBs in response to a request from a not-illustrated input device or each client with which communications are performed via the Internet 2. Further, this DB management unit 331 is implemented by the CPU 310's execution of a DB management program stored in the storage 330.

Next, the configuration of the electronic apparatus 1 for implementing the function of performing the management of purchase of products will be explained. The purchase management application 132 is developed and implemented in the memory 120 by the CPU 110 and implements the function in cooperation with various pieces of hardware.

The purchase management application 132 has an application control unit 133, an information updating unit 134, an information acquiring unit 135, and a screen generating unit 136.

The application control unit 133 has a function of integratedly controlling the purchase management application 132. When an instruction to start the purchase management application 132 is received from the user via, for example, the touch panel 142, the purchase management application 132 is started, and the application control unit 133 instructs the information acquiring unit 135 to acquire various pieces of information from the product information DB 332 and the user information DB 333 of the server 3.

The information acquiring unit 135 has a function of acquiring the above-mentioned pieces of information from the server 3 via the communication unit 170. Further, the information acquiring unit 135 can transmit the pieces of information acquired thereby to the application control unit 133 and the screen generating unit 136.

When verifying that the information acquiring unit 135 has acquired the pieces of information, the application control unit 133 instructs the screen generating unit 136 to generate various screens.

The screen generating unit 136 has a function of generating image information about various screens and transmitting the image information to the display control unit 150, thereby displaying a screen on the display 151. More specifically, the application control unit 133, the screen generating unit 136, and the display control unit 150 function as a display means singularly or independently. The above-mentioned various screens will be explained later in detail.

The information updating unit 134 has a function of updating the user information DB 333 of the server 3. When a predetermined operation is performed by the user via the touch panel 142, the application control unit 133 instructs the information updating unit 134 to update information in the user information DB 333, and the information updating unit 134 updates the user information DB 333 via the communication unit 170.

In this embodiment, many pieces of data are managed and updated on the server 3, as mentioned above. Although the explanation is made by showing the example in which the purchase management application 132 acquires this information whenever necessary and carries out the function, this embodiment is not limited to this example, and, for example, a configuration can be provided in which the whole or part of the product information DB 332 and the user information DB 333 is included in the purchase management application 132.

Further, although the configuration in which various pieces of information are acquired from the server 3 when the purchase management application 132 is activated is explained, it may be such that information at the time of the previous activation or termination is stored, and an image is initially displayed using this information. In this case, because the time for the information acquisition from the server 3 can be skipped, the time required from the activation to the information display can be shortened.

Next, various screens displayed by the purchase management application 132 will be explained.

FIGS. 4 to 9 are views showing examples of the screens displayed by the purchase management application 132.

The purchase management application 132 provides a product list screen in which pieces of summary information about multiple products are displayed, and a product detailed screen in which detailed information about each product is displayed to the user. The purchase management application 132 is configured to, when a product is selected on the product list screen, display the product detailed screen about the selected product.

Figure 4:
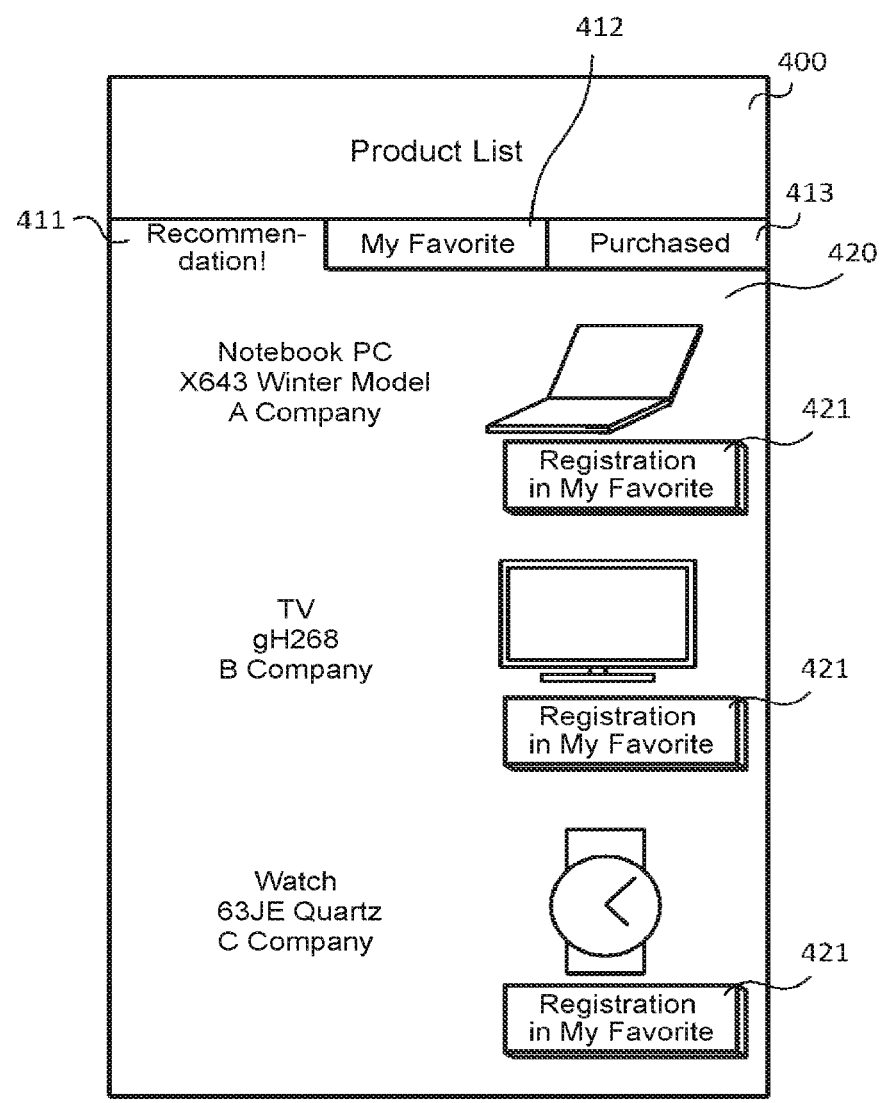
FIG. 4 is a view showing an example of a screen displayed by a purchase management application according to Embodiment 1.

For example, a product list screen 400 is displayed in FIG. 4. Three tabs: a "recommendation!" tab 411, a "my favorite" tab 412, and a "purchased" tab 413 are displayed on the product list screen 400, and the "recommendation!" tab 411 is selected on the product list screen 400 in FIG. 4. While the "recommendation!" tab 411 is selected, a "recommendation!" list 420 (first image) is displayed below the tab. The "recommendation!" list 420 displays products which the purchase management system 900 recommends to the user, and pieces of summary information about the products and photographs of the products are displayed. As these recommended products, identical products can be presented collectively to all users, or products suiting each user's preference can be searched on the basis of, for example, the taste trend or the like of the products registered in the user's favorite and the products which the user has purchased, and can be recommended to each user. These recommended products are determined by the providing dealer of the purchase management system 900, and are registered by the server 3.

Products are assigned to each of the above-mentioned tabs: the "recommendation!" tab 411, the "my favorite" tab 412, and the "purchased" tab 413, and, when each of the tabs is selected, the purchase management application 132 displays a list of the products assigned to its category (purchase consideration state). Because the products assigned to each of the different categories are selectively displayed by using a tab display, the user can recognize the products assigned to each of the categories without getting confused.

Further, in the "recommendation!" list 420 on the product list screen 400, "registration in my favorite" buttons 421 are displayed. By selecting a "registration in my favorite" button 421, the user can register a target product in the category of "my favorite."

Next, a product detailed screen will be explained. When each product displayed in the "recommendation!" list 420 of FIG. 4 is selected, the purchase management application 132 displays the product detailed screen about the product. For example, when the user selects (touches) a notebook PC displayed on the top of the "recommendation!" list 420 of FIG. 4, the purchase management application 132 displays a product detailed screen 500 (fourth image) of FIG. 5.

Product summary information 510, official information 520, purchase site & review information 530, and a "registration in my favorite" button 540 are displayed on the product detailed screen 500.

The product summary information 510 is displayed, together with the category name "recommendation!" of the selected product, on an upper portion of the product detailed screen 500. In the product summary information 510 of this embodiment, the category (notebook PC) of the product, model number information (X643 winter model), the manufacturing company (A company), and a photograph of the product are displayed.

In the official information 520, for example, product specification information, information about an operation manual, information about the official site of the manufacturer or a sales agency of the product, FAQ information, information about contact for repair request, inquiry form/telephone number information, information about a related cloud service (e.g., an official image sharing site of the manufacturer of a digital camera), and so on are included.

In the purchase site & review information 530, information which is not information officially provided by a provider of the product, for example, information about a purchase site from which the product can be purchased, information about a site in which a review about the product can be viewed, information about a moving image site in which a moving image about the product can be viewed, information about a review report site, information about a price comparison site, information about an SNS, a blog, or a hashtag invoking in an SNS, and so on are included.

The "registration in my favorite" button 540 is the one for allowing the user to register this product in the user's favorite by selecting the button itself. The button has the same function as that of each "registration in my favorite" button 421 in FIG. 4. Further, on the product detailed screen 500 in this embodiment, this "registration in my favorite" button 540 is placed at a position in a right-side portion below the product summary information 510.

Next, a display screen of products registered in the category of "my favorite" will be explained.

Figure 6:
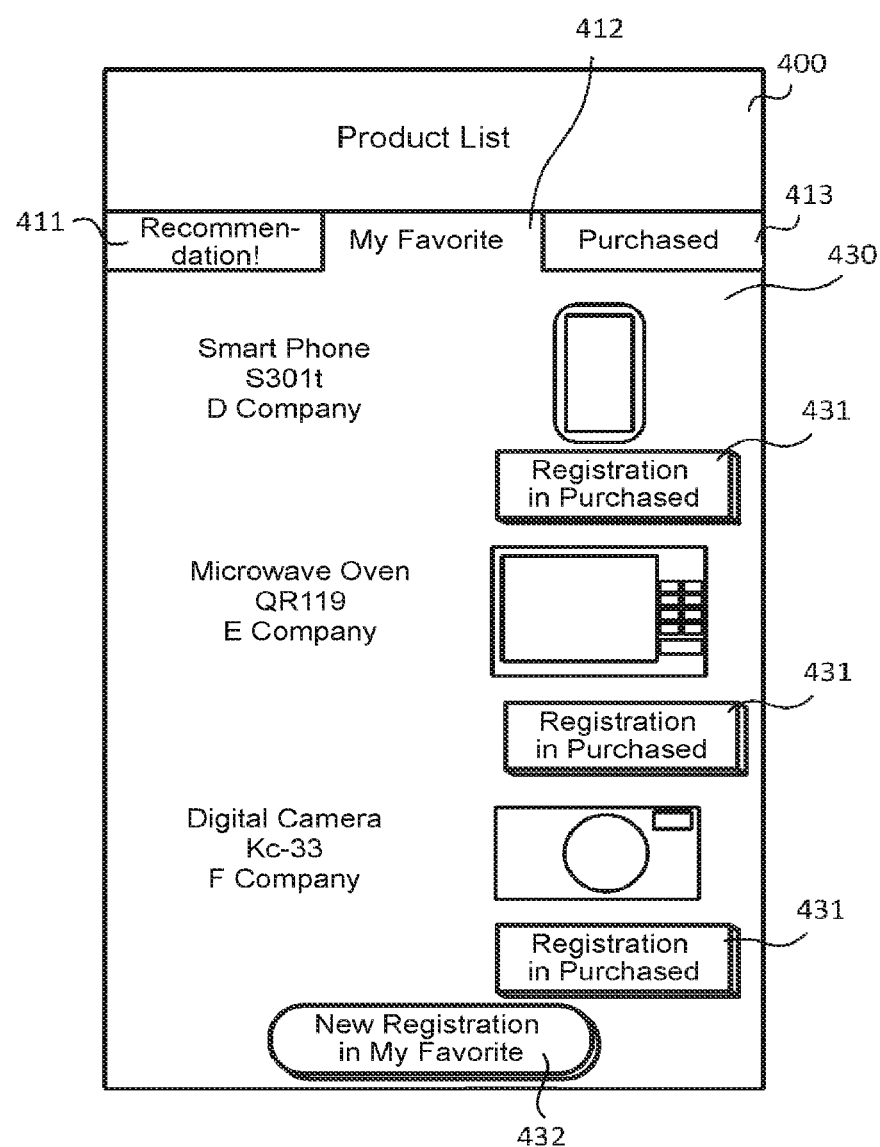
FIG. 6 is a view showing an example of a screen displayed by the purchase management application according to Embodiment 1.

FIG. 6 is an example of a product list screen 400 in which a "my favorite" list 430 of the "my favorite" tab 412 is displayed.

While the "my favorite" tab 412 is selected, the purchase management application 132 displays the "my favorite" list 430 (second image) which is the list display of the products registered in the "my favorite" category. In the "my favorite" list 430, a "registration in purchased" button 431 is disposed for each of the products. When the user has purchased a product registered in the "my favorite" category, the user can move this product to the "purchased" category by pushing the "registration in purchased" button 431.

Further, in a lower portion of the "my favorite" list 430, a "new registration in my favorite" button 432 is disposed, and, when the user selects this "new registration in my favorite" button 432 and inputs information about the product which the user desires to register, the product can be newly registered in the "my favorite" category. As to the product newly registered, the product information is added to the "my favorite" list 430.

When the user selects one product in the "my favorite" list 430, the purchase management application 132 displays a product detailed screen.

Figure 7:
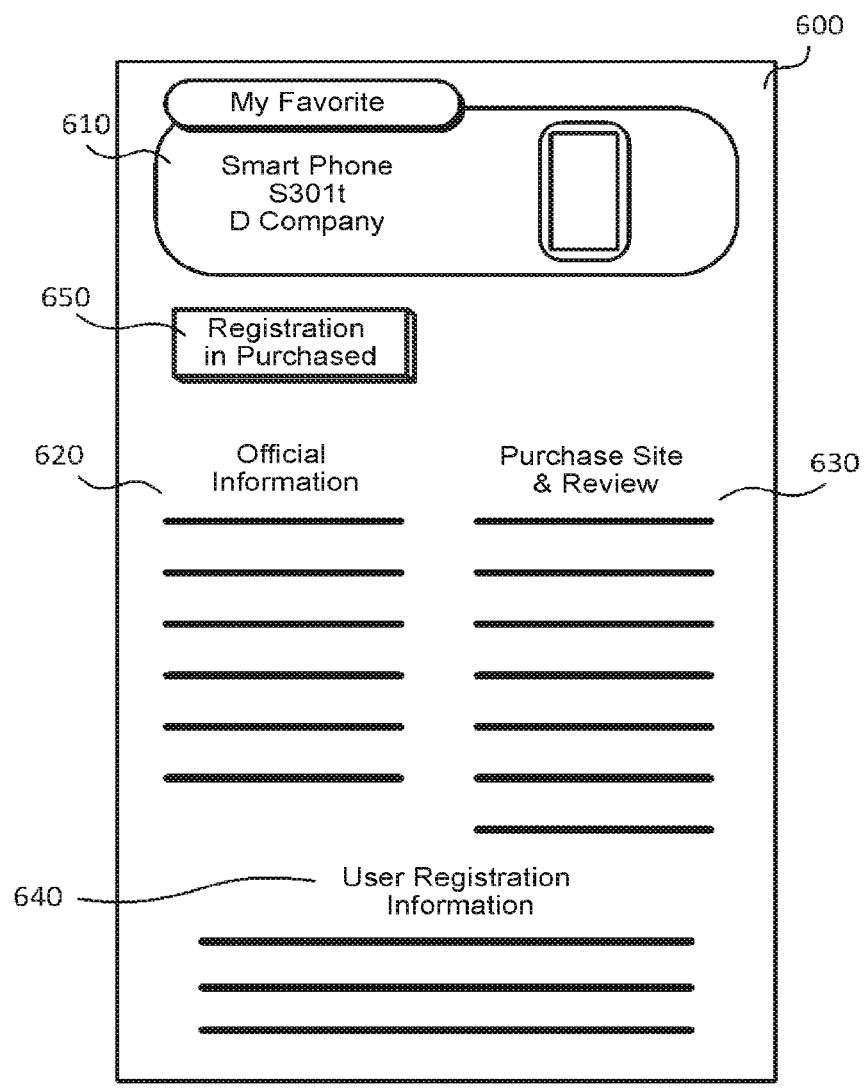
FIG. 7 is a view showing an example of a screen displayed by the purchase management application according to Embodiment 1.

FIG. 7 is a product detailed screen 600 (fifth image) showing the product detailed information about a product registered in the "my favorite" category. On the product detailed screen 600, product summary information 610, official information 620, purchase site & review information 630, user registration information 640, and a "registration in purchased" button 650 are displayed.

Figure 5:
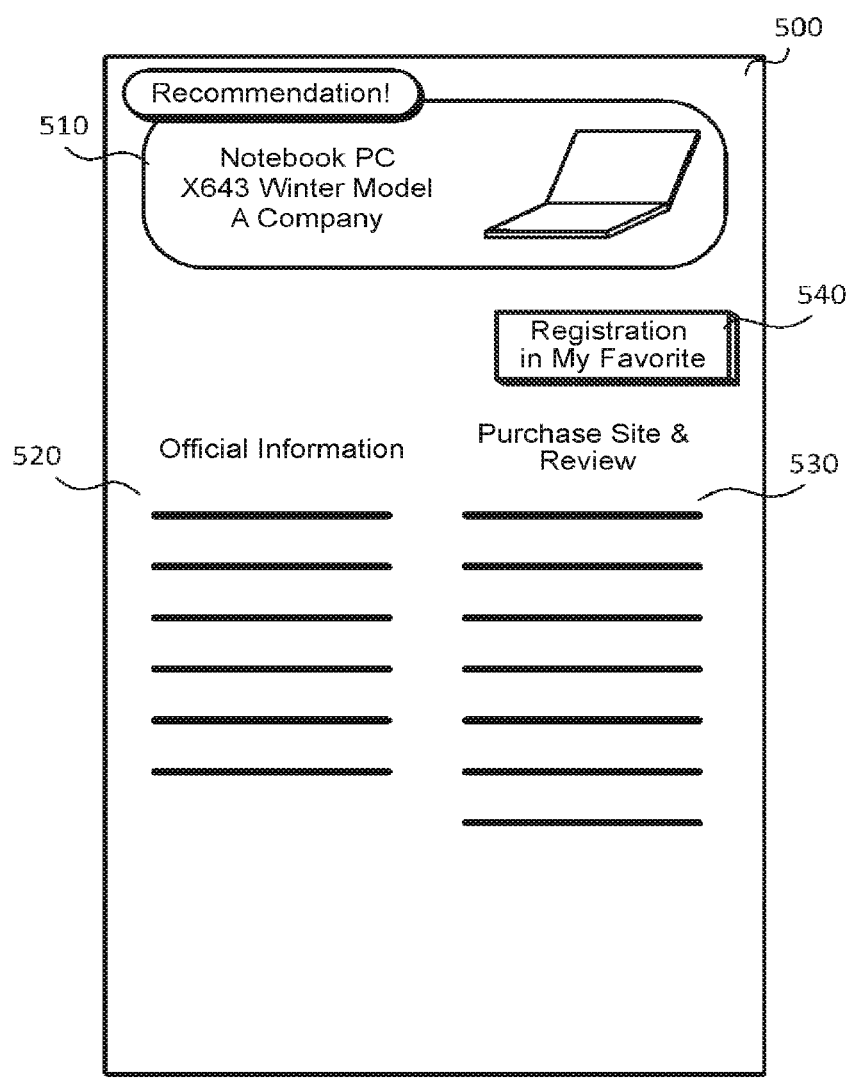
FIG. 5 is a view showing an example of a screen displayed by the purchase management application according to Embodiment 1.

In the product summary information 610, the official information 620, and the purchase site & review information 630, summary information, official information, and information about a purchase site & review which are related to the target product, like those of FIG. 5, are displayed, respectively.

In the user registration information 640, information which the user has registered as to this product is displayed. As the information displayed here, the user's memo about the product, the URL of a favorite page, and so on are included.

The "registration in purchased" button 650 is the one for moving the product registered in the "my favorite" category to the "purchased" category, and the user can move this product to the "purchased" category by selecting the "registration in purchased" button 650. This function is the same as that of each "registration in purchased" button 431 of FIG. 6.

On the product detailed screen 600 in this embodiment, the "registration in purchased" button 650 is placed at a position in a left-side portion below the product summary information 610. Although on the product detailed screen 500 in the "recommendation!" category of FIG. 5, the "registration in my favorite" button 540 for registering the product in the "my favorite" category is displayed at a position in a right-side portion below the product summary information 510, on the product detailed screen 600 on which the detailed information about a product registered in the "my favorite" category is displayed, the "registration in purchased" button 650 for registering the product in the "purchased" category is displayed at a position in a left-side portion below the product summary information 610. Although these buttons are the ones each for registering the product in the next category and are similar in their functions, the buttons are configured so as to be displayed at different positions, thereby preventing the user from confusing their corresponding categories. In other words, because if the buttons are displayed at the same position on the screens, there is a possibility that there occurs a mistake of registering the product in a category in which the user does not desire to register the product, the buttons are placed at different positions on the product detailed screens in order to avoid this mistake.

Next, a display screen of products registered in the "purchased" category will be explained.

Figure 8:
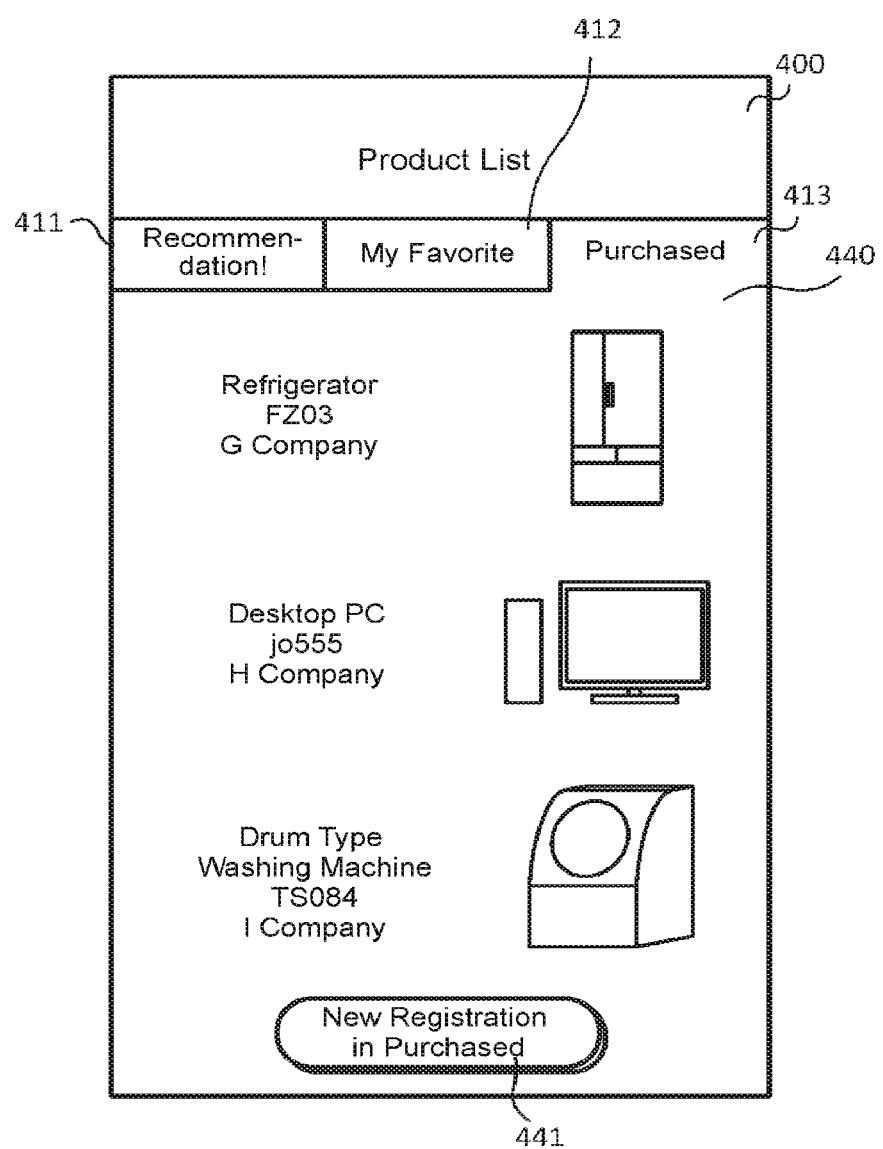
FIG. 8 is a view showing an example of a screen displayed by the purchase management application according to Embodiment 1.

FIG. 8 is an example of a product list screen 400 in which a "purchased" list 440 of the "purchased" tab 413 is displayed.

While the "purchased" tab 413 is selected, the purchase management application 132 displays the "purchased" list 440 (third image) which is the list display of the products registered in the "purchased" category.

In a lower portion of the "purchased" list 440, a "new registration in purchased" button 441 is disposed and, when the user selects this "new registration in purchased" button 441 and inputs information about a product which the user desires to register, the product can be newly registered in the "purchased" category. As to the product newly registered, the product information is added to the "purchased" list 440.

When the user selects one product in the "purchased" list 440, the purchase management application 132 displays a product detailed screen.

Figure 9:
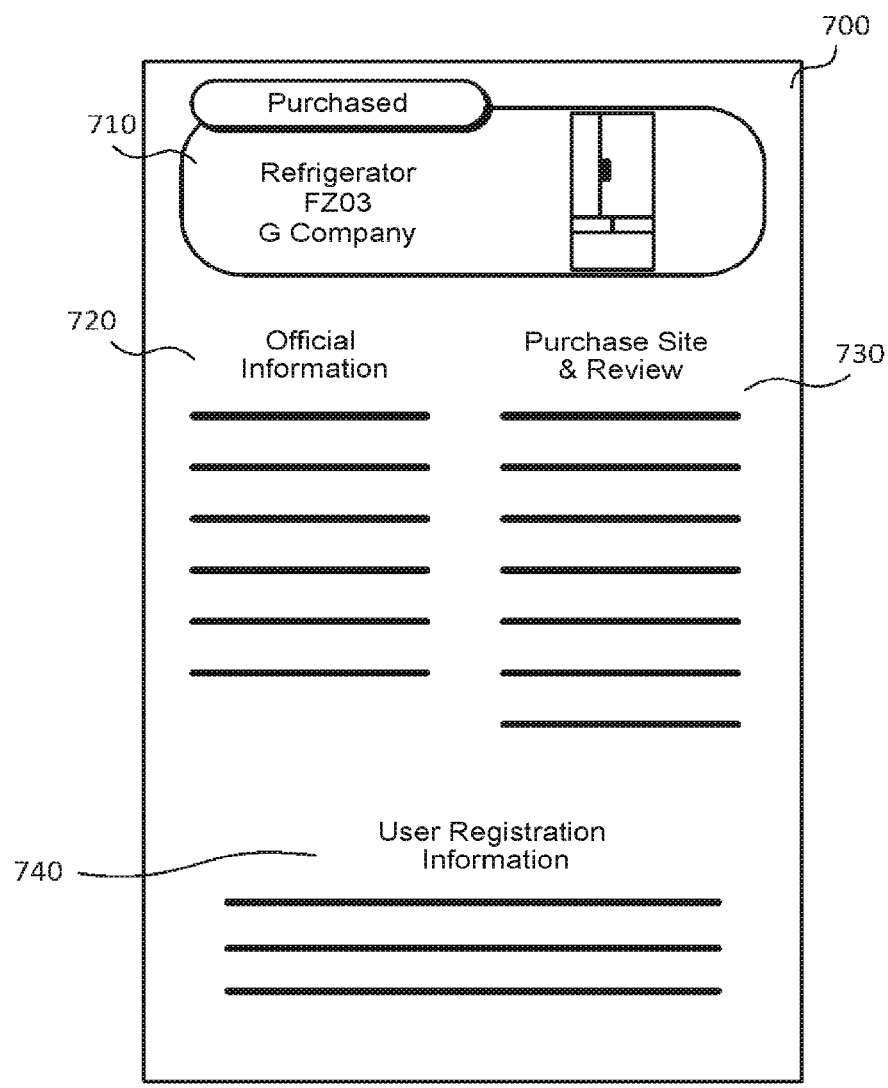
FIG. 9 is a view showing an example of a screen displayed by the purchase management application according to Embodiment 1.

FIG. 9 is a product detailed screen 700 (sixth image) showing the product detailed information about a product registered in the "purchased" category. On the product detailed screen 700, product summary information 710, official information 720, purchase site & review information 730, and user registration information 740 are displayed.

In the product summary information 710, the official information 720, and the purchase site & review information 730, summary information, official information, and information about a purchase site & review which are related to the target product, like those of FIGS. 5 and 7, are displayed, respectively.

In the user registration information 740, information which the user has registered as to this product is displayed. As the information displayed here, in addition to the user's memo about the product, the URL of a favorite page, and so on which are described in the explanation of FIG. 7, the purchase date, the purchase price, the warranty period, a photograph of the product, and so on are included.

User registration information is not included in each product detailed information in the "recommendation!" category, but is included in each product detailed information in the "my favorite" category and in each product detailed information in the "purchased" category. This is because it is conceivable that there is no information which the user especially registers for a product in the "recommendation!" category at the time that the product is recommended to the user, and information which the user desires to register increases as the registration of the product is moved to the "my favorite" category and then to the "purchased" category. In other words, required user information can be registered in the purchase management system 900 at a required timing without being conscious of registering information.

The purchase management application 132 in this embodiment displays each product as the "recommendation!" category, the "my favorite" category, or the "purchased" category. On each of the following screens: the product list screen 400 and the product detailed screen 500, a "registration in my favorite" button 421 or 540 is displayed for each product displayed as the "recommendation!" category, and the user can register the product in the "my favorite" category by selecting this button. Further, on each of the following screens: the product list screen 400 and the product detailed screen 600, a "registration in purchased" button 431 or 630 is displayed for each product displayed in the "my favorite" category, and the user can move the product from the "my favorite" category to the "purchased" category by selecting this button.

The purchase management application 132 performs appropriate display in accordance with the state of the registration (assignment) of each product in a category. As to this display, a difference in the display form will be explained using FIGS. 10 and 11.

Figure 10B:
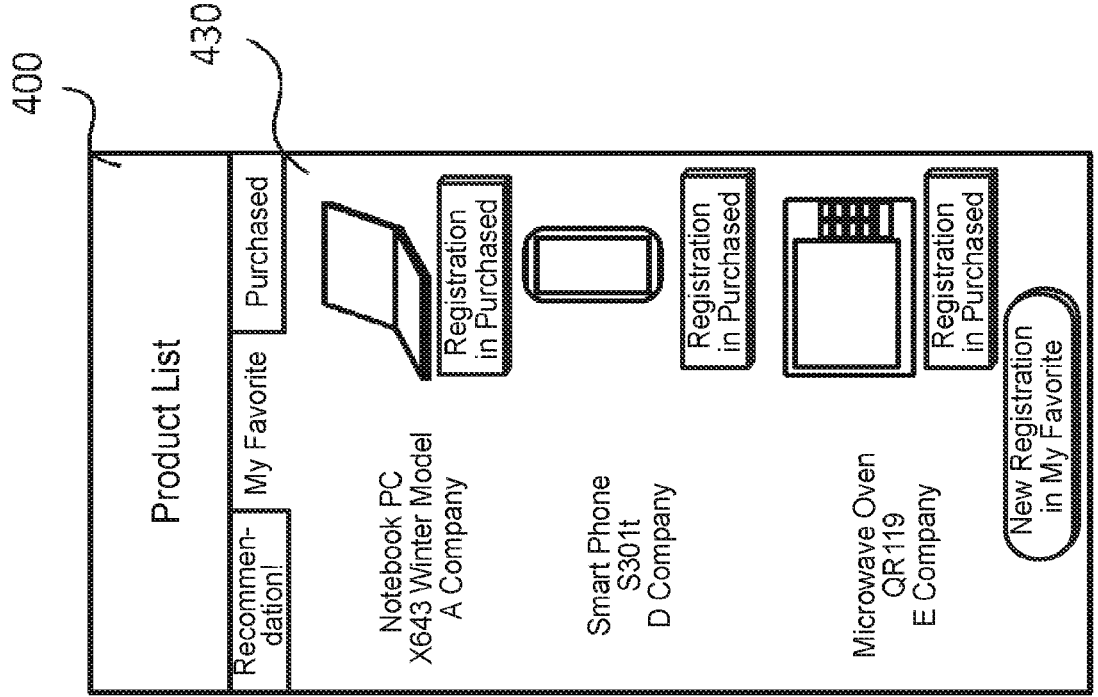
Figure 10B:
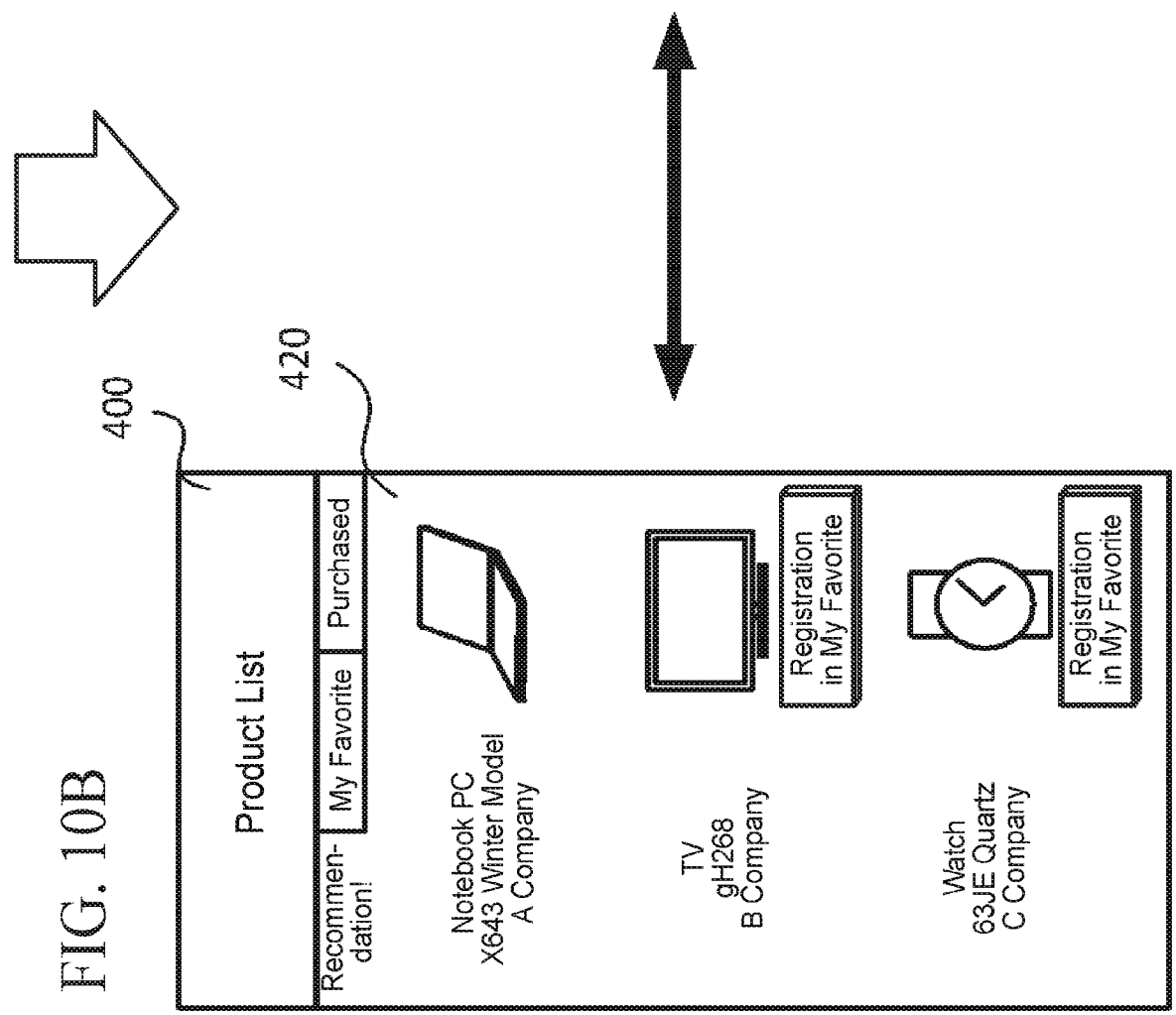
Figure 11B:
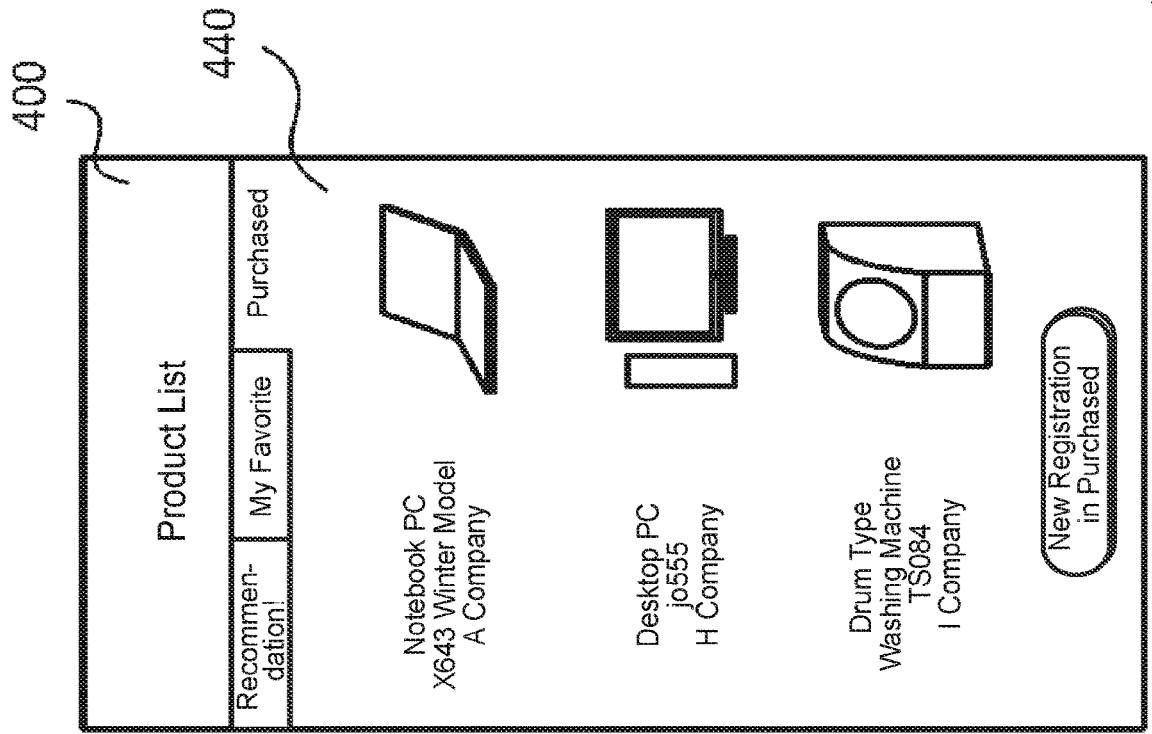
Figure 11B:
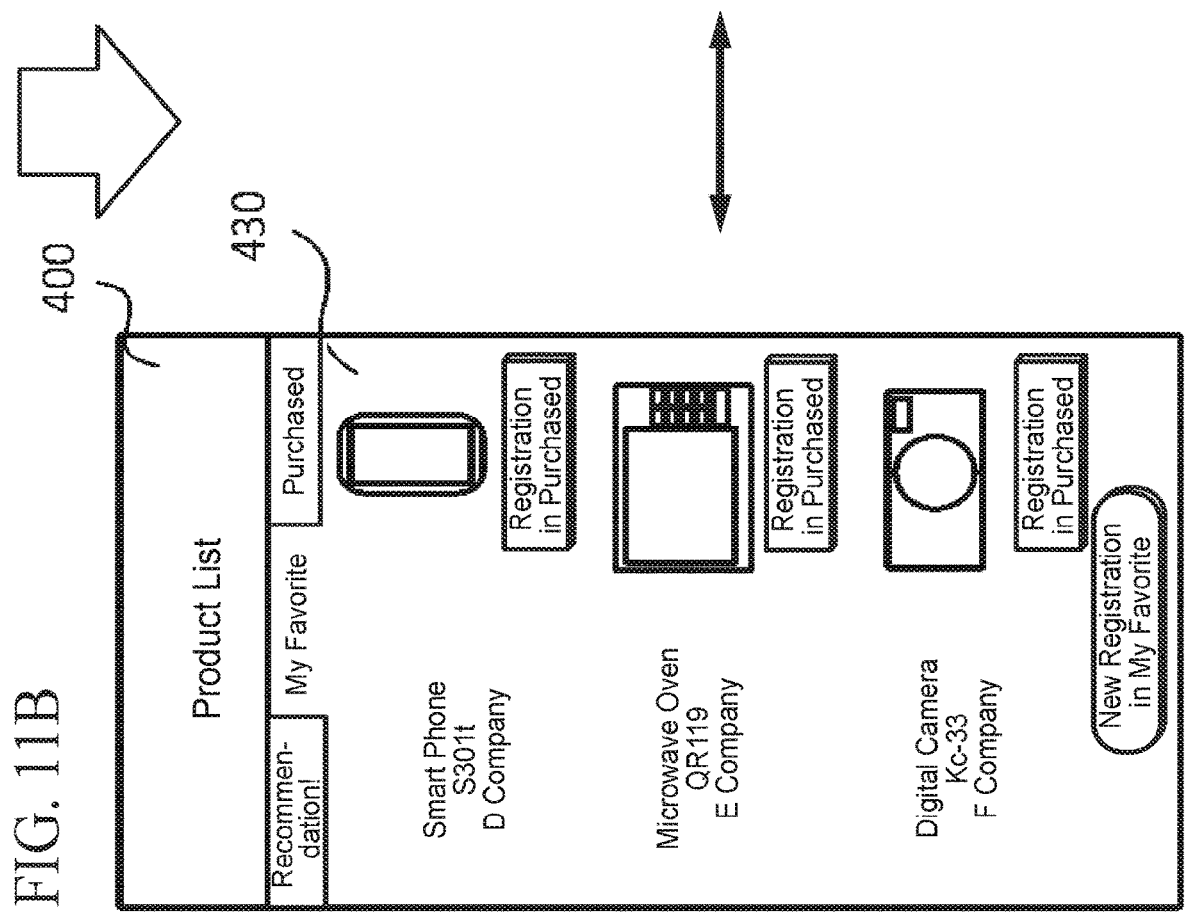

FIGS. 10 and 11 are views showing examples of screen switching in this embodiment.

FIGS. 10A, and 10B are one example of the screen switching when a product displayed in the "recommendation!" category is registered in the "my favorite" category.

For example, when the "registration in my favorite" button 421 or 540 of the notebook PC on the product list screen 400 or the product detailed screen 500 is touched (selected) by the user (upper view), the notebook PC is added to the "my favorite" list 430 which is the screen of the "my favorite" tab 412 (lower right view) since this notebook PC is registered in the "my favorite" category. However, this notebook PC is not deleted from the "recommendation!" list 420 of the "recommendation!" tab 411 (lower left view). By selecting the "recommendation!" tab 411 or the "my favorite" tab 412, the user can recognize the notebook PC in the corresponding list. At that time, the "registration in my favorite" button 421 is no longer displayed in the summary display of the notebook PC in the "recommendation!" list 420. At this time, in addition to non-display of the button, a comment showing that the product has been registered in the "my favorite" category, such as "Already registered in my favorite", can be displayed.

The purchase management application 132 performs such display on the basis of a belief that each product displayed in the "recommendation!" list 420 is information about a product recommended by the provider of the purchase management application 132, and the registration of a product in the "my favorite" category does not necessitate the deletion of the product from the "recommendation!" category. Even after registering a product in the "my favorite" category, the user can also check how long the product has been remained in the "recommendation!" category, and can also grasp the degree of recommendation of the product recommended by the provider of the purchase management application 132.

Next, a display example in a case in which a product is moved from the "my favorite" category to the "purchased" category will be explained.

FIGS. 11A and 11B are one example of the screen switching in a case in which a product displayed in the "my favorite" category is moved to the "purchased" category.

When the "registration in purchased" button 431 or 650 of the notebook PC on the product list screen 400 or the product detailed screen 600 is touched (selected) by the user (upper view), this notebook PC is added to the "purchased" list 440 which is the screen of the "purchased" tab 413 since the notebook PC is moved from the "my favorite" category to the "purchased" category (lower right view). Here, this notebook PC is deleted from the "my favorite" list 430 of the "my favorite" tab 412 (lower left view).

In general, it can be conceivable that when the user is interested in a product, the user registers the product in the "my favorite" category first, and, after the user performs a purchase consideration and have purchased the product, the product is moved to the "purchased" category. More specifically, the category of a product can be progressively changed from the "my favorite" category to the "purchased" category, and the necessity to register a product both in the "my favorite" category and in the "purchased" category is not high. Therefore, in this embodiment, any product moved from the "my favorite" category to the "purchased" category is displayed only in the "purchased" category, and is no longer displayed in the "my favorite" category.

More specifically, when a product is displayed as the "recommendation!" category which is a first classification (category), and then this product is registered in the "my favorite" category which is a second classification (category), this product is displayed as one belonging to the "recommendation!" category which is the first classification (category) and as one belonging to the "my favorite" category which is the second classification (category). Further, when this product is registered in the "purchased" category which is a third classification (category), this product is deleted from the products belonging to the "my favorite" category which is the second classification (category), and is displayed as one belonging to the "purchased" category which is the third classification (category).

In this way, although the purchase management application 132 selectively displays the products belonging to each of the classifications (categories), when a product registered in the first classification (category) is registered in the second classification (category), the purchase management application 132 displays this product as one registered in the first and second classifications (categories), and, when a product registered in the second classification (category) is registered in the third classification (category), the purchase management application 132 does not display this product as one registered in the second classification (category), but displays this product as one registered in the third classification (category). Because each of the classifications (categories) is displayed selectively, the user can easily recognize the products belonging to each of the classifications (categories), and, because when a product registered in a classification (category) is registered in another classification (category), a display suitable for the registration in each of the classifications (categories) is performed, the user can precisely recognize the products registered in each of the classifications (categories).

Next, a flow of the processing in this embodiment will be explained.

Figure 12:
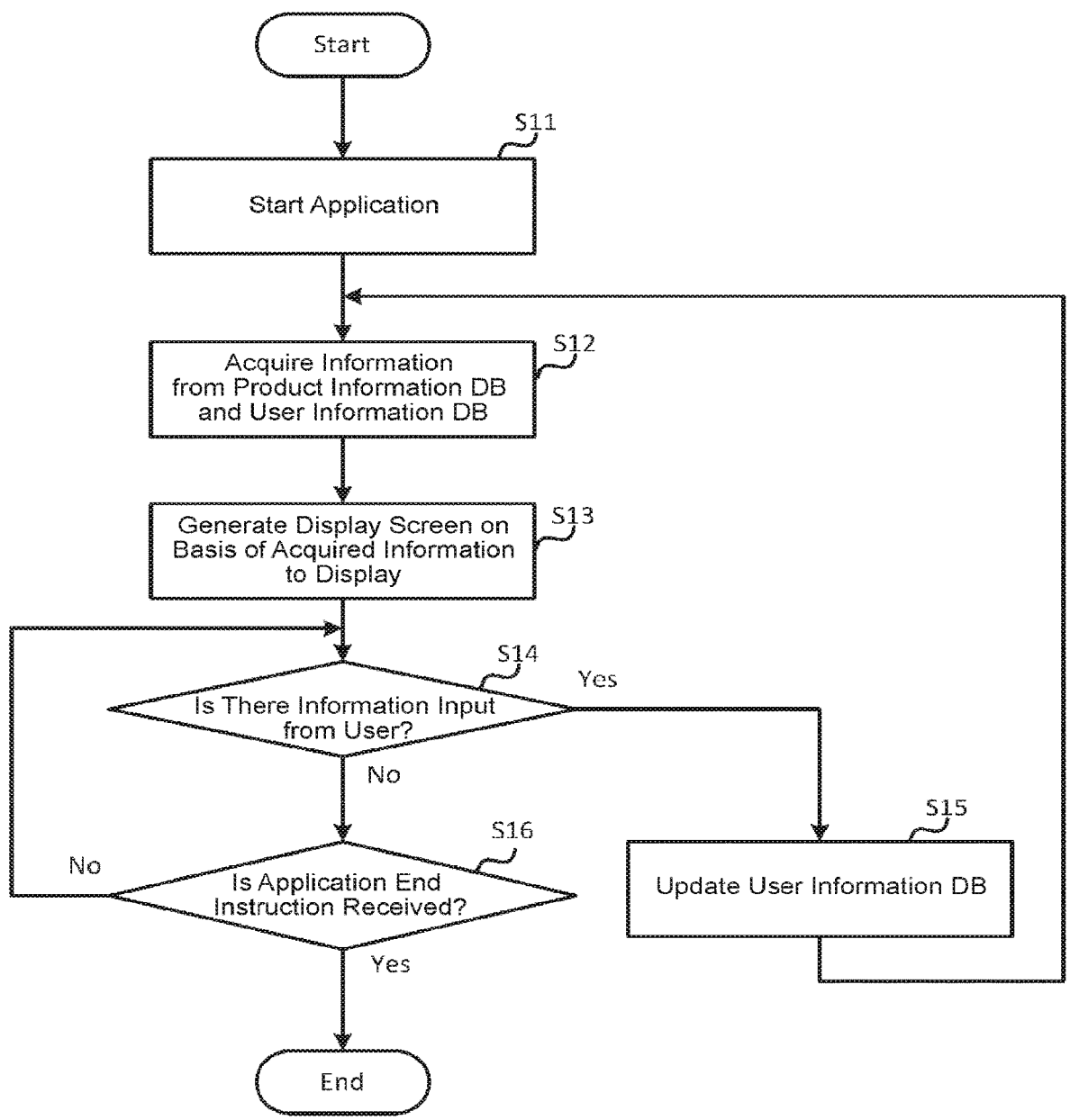
FIG. 12 is a flow chart showing an example of a flow of processing of the purchase management application according to Embodiment 1.

FIG. 12 is a flow chart showing an example of the flow of the processing of the purchase management application 132 in this embodiment.

First, when the OS 131 receives an application start instruction provided by the user, the OS 131 starts the purchase management application 132 (step S11).

When the purchase management application 132 is started, the application control unit 133 specifies information identifying a user such as an ID (Identifier) and instructs the information acquiring unit 135 to acquire the information, and the information acquiring unit 135 transmits a data transmission request, together with the information identifying the user, via the communication unit 170 and acquires the pieces of product information and the user information from the product information DB 332 and the user information DB 333 of the server 3 (step S12). Each information to be acquired can be data for display such as data in HTML, or can be structured data such as data in XML (Extensible Markup Language).

When the information acquiring unit 135 acquires the pieces of information, the application control unit 133 instructs the screen generating unit 136 to generate images, and the screen generating unit 136 generates display screens as shown in FIGS. 4 to 9 on the basis of the pieces of information acquired by the information acquiring unit 135 and displays one of the display screens on the display 151 (step S13). For example, when data for display such as data in HTML is acquired, image data is generated and displayed using a well-known drawing module for browsers (HTML rendering engine or the like). Further, when each data is not data in form that it can be displayed just as it is, such as when each data is data in XML, the type of each data is identified from the data structure, the data is embedded in data for display prepared in advance as a template in accordance with the data type, and image data is generated. Further, for the product detailed information 500 in the "recommendation!" category, the screen generating unit 136 generates and displays a "registration in my favorite" button 540, and, for the product detailed screen 600, the screen generating unit generates and displays a "registration in purchased" button 650. At the time of this process, the screen generating unit 136 causes a difference between the relative position of the "registration in my favorite" button 540 on the image of the product detailed information 500 and the relative position of the "registration in purchased" button 650 on the product detailed screen 600, as mentioned above. As a result, the user's confusion and failure in operation can be prevented.

Next, the application control unit 133 determines whether or not there is an information input of a displayed product or user information from the user (step S14). When there is an information input (Yes in step S14), the application control unit 133 instructs the information updating unit 134 to update the user information DB 333, and the information updating unit 134 which has received the instruction transmits the information inputted together with the information identifying the user via the communication unit 170 and updates the user information DB 333 of the server 3 (step S15). When the information updating unit 134 updates the user information DB 333 of the server 3, the processing flow returns to step S12 and returns to the flow of acquiring the pieces of product information and the user information and generating display screens. By performing the process in this way, as to not only the updated user information, but also the pieces of product information in the product information DB 332 updated whenever necessary, the pieces of display information provided for the user can be updated with a high update frequency. When there is no information input in step S14 (No in step S14), the application control unit 133 determines whether or not an instruction to end the application has been received from the user (step S16).

While the end instruction is not received in step S16 (No in step S16), the processing returns to step S14 and when the end instruction is received in step S16 (Yes in step S16), the application control unit 133 performs a process of ending the application and the processing flow is ended.

Next, a processing flow at a time of receiving an instruction to register a product in a category will be explained, as an example of the updating process of step 15 of FIG. 12, by using FIG. 13.

Figure 13:
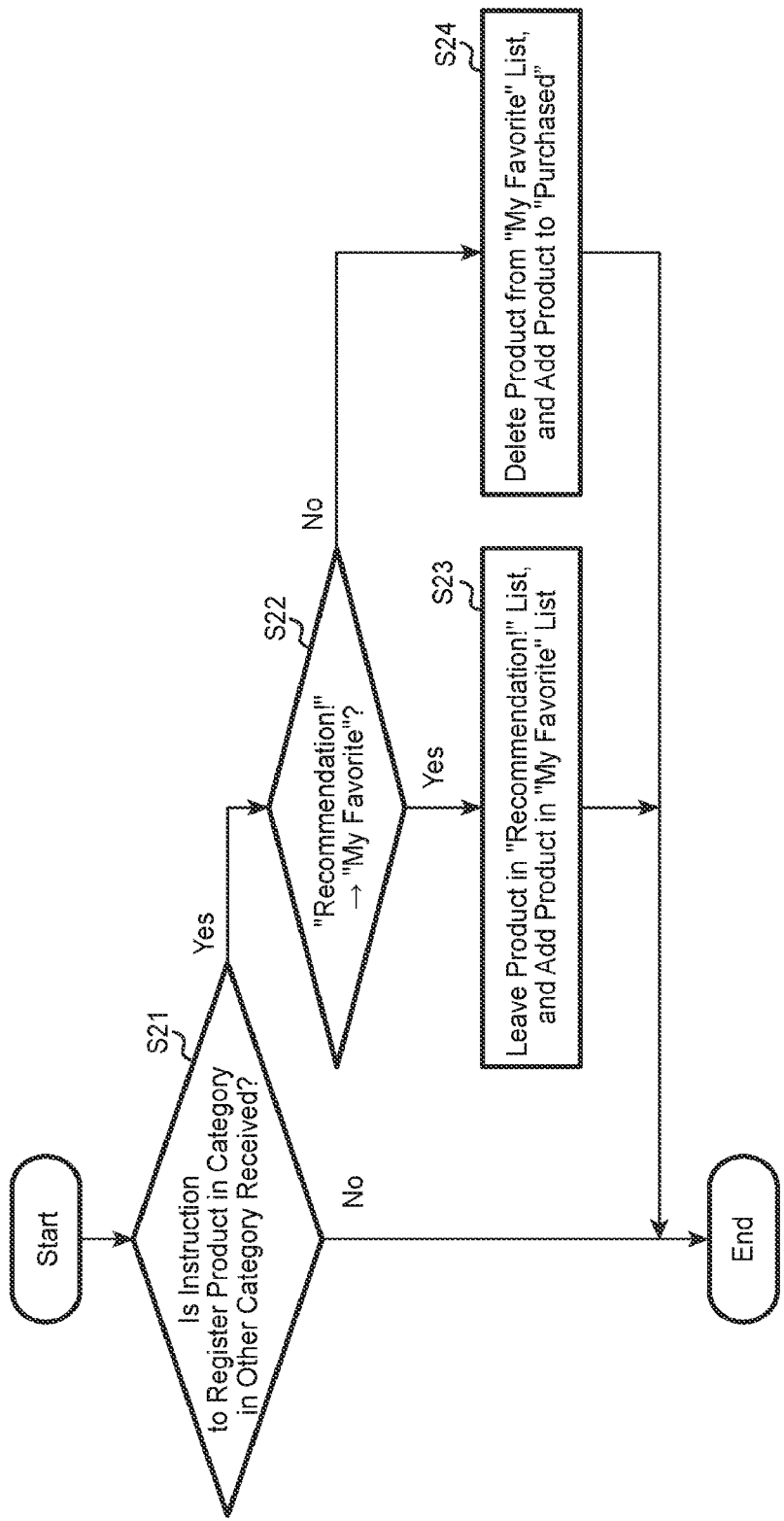
FIG. 13 is a flow chart showing an example of a flow of the processing of the purchase management application according to Embodiment 1.

FIG. 13 is a flow chart showing an example of the flow of the processing of the purchase management application 132 at a time of receiving an instruction to register a product in a category in this embodiment.

First, the application control unit 133 of the purchase management application 132 determines whether or not the information inputted from the user in step S14 of FIG. 12 is an instruction to register a product registered in a category in another category (step S21).

When an instruction to register a product in a category is received (Yes in step S21), the application control unit 133 determines whether or not the registration is the one of a product registered in the "recommendation!" category in the "my favorite" category (step S22).

When the registration is the one of a product registered in the "recommendation!" category in the "my favorite" category (Yes in step S22), the application control unit 133 transmits data for updating the user information DB 333 to the server 3 via the information updating unit 134.

Figure 14:
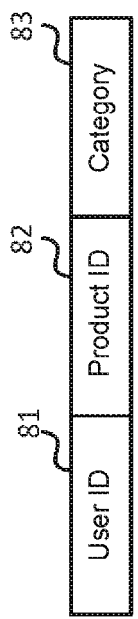
FIG. 14 is a view showing an example of data which the purchase management application according to Embodiment 1 transmits to a server.

An example of the data transmitted here is shown in FIG. 14. The data transmitted to the server 3 for an update of the user information DB 333 as to the new registration in a category includes a user ID 81, a product ID 82, and category information 83. The user ID 81 is the user's ID information, and the product ID is ID information about the product. Further, the category information 82 is the one about the category in which the product is registered newly, and is the one about "my favorite" or "purchased" in this embodiment. Although in this embodiment, it is explained that when the user performs the new registration of a product in a category, those pieces of information are transmitted, this embodiment is not limited to this example. For example, other information can be additionally transmitted, and pieces of new registration information about multiple products can be transmitted collectively. In the case in which other information is added, the information is further added to the data structure shown in FIG. 14, and, in the case in which multiple pieces of new registration information are transmitted collectively, multiple product IDs and multiple pieces of information each about a category are brought into correspondence with each other, and are added to transmission information shown in FIG. 14.

After or before the transmission, the application control unit 133 issues an instruction to the screen generating unit 136, to add information about the product to the "my favorite" list 430 in a state which this product information is remained in the "recommendation!" list 420 (step S23).

When the registration is not the one of a product registered in the "recommendation!" category in the "my favorite" category (No in step S22), the application control unit 133 determines that the registration instruction is the one from the "my favorite" to the category "purchased" category, because, in this embodiment, the instruction to register a product registered in a category in another category includes only one from the "recommendation!" category to the "my favorite" category, and one from the "my favorite" to the category "purchased" category, and the application control unit causes the information updating unit 134 to transmit the user ID, the product ID, and data with which the categories are brought into correspondence, and instructs the screen generating unit 136 to delete the information about the product from the "my favorite" list 430 and add this product information to the "purchased" list 440 (step S24).

When no registration instruction is received in step S21 (No in step S21), the application control unit 133 performs an updating process on another information input. After this process is ended and after step S23 or step S24 is ended, this processing flow is ended.

The present invention is explained above on the basis of the embodiment. It is needless to say that various variants can be made in each of the components of the embodiment and in the combination of processes.

REFERENCE SIGNS LIST

900 . . . purchase management system, 1 . . . electronic apparatus, 2 . . . Internet, 3 . . . server, 110 . . . CPU, 120 . . . memory, 130 . . . storage, 131 . . . OS, 132 . . . purchase management application, 133 . . . application control unit, 134 . . . information updating unit, 135 . . . information acquiring unit, 136 . . . screen generating unit, 140 . . . input control unit, 141 . . . HW button, 142 . . . touch panel, 150 . . . display control unit, 151 . . . display, 160 . . . sound control unit, 161 . . . microphone, 162 . . . speaker, 170 . . . communication unit, 171 . . . antenna, 180 . . . bus, 310 . . . CPU, 320 . . . memory, 330 . . . storage, 331 . . . DB management unit, 332 . . . product information DB, 333 . . . user information DB, 340 . . . communication unit, and 350 . . . bus

The invention claimed is:

1. An apparatus comprising at least one processor and at least one memory coupled to the at least one processor, wherein the at least one processor is configured to:
generate a first version of a graphical user interface, wherein the first version of the graphical user interface displays representations associated with a product in an instance in which the product is labeled with a first status, wherein the first version of the graphical user interface comprises a product information region comprising a set of information about the product and a first registration interface component, wherein the first registration interface component is displayed in a first predetermined location on the first version of the graphical user interface based at least in part on the first version of the graphical user interface being associated with the first status, wherein selection of the first registration interface component changes the first status to a second status;
generate a second version of the graphical user interface, wherein the second version of the graphical user interface displays the representations associated with the product in an instance in which the product is labeled with a second status, wherein the second version of the graphical user interface comprises the product information region including the set of information about the product and a second registration interface component, wherein the second registration interface component is displayed in a second predetermined location on the second version of the graphical user interface based at least in part on the second version of the graphical user interface being associated with the second status, wherein the first predetermined location and the second predetermined location do not occupy a same portion of the graphical user interface to prevent a user from mistakenly selecting the first registration interface component or the second registration interface component, wherein the first version of the graphical user interface does not have the second registration interface component, wherein selection of the second registration interface component changes the second status to a third status, wherein the second version of the graphical user interface does not have the first registration interface component;
receive an input indicating a selection of the second status; and
selectively display the second version of the graphical user interface based at least in part on the selection of the second status, wherein selectively displaying the second version of the graphical user interface based at least in part on the selection of the second status comprises replacing the first version of the graphical user interface with the second version of the graphical user interface, the replacing causing deactivation of the first registration interface component such that the first registration interface component does not appear on the second version of the graphical user interface and the first registration interface component is not selectable on the second version of the graphical user interface.

2. The apparatus of claim 1, wherein the product is labeled with the first status in an instance in which the product is registered in a first classification and the product is labeled with the second status in an instance in which the product is registered in a second classification.

3. The apparatus of claim 2, wherein the at least one processor is configured to:
receive a user selection of the second registration interface component; and
in response to the user selection of the second registration interface component, cause the product to be registered in a third classification and unregistered from the second classification.

4. The apparatus of claim 1, wherein the set of information about the product comprises official information about the product and purchase site information about the product.

5. The apparatus of claim 4, wherein the product information region is displayed in a first location on the first version of the graphical user interface and the product information region is displayed in the first location on the second version of the graphical user interface.

6. The apparatus of claim 4, wherein the official information about the product or the purchase site information about the product is generated using artificial intelligence.

7. The apparatus of claim 1, wherein the second version of the graphical user interface comprises a second product information region comprising a second set of information about the product.

8. The apparatus of claim 7, wherein the second set of information about the product comprises user registration information.

9. The apparatus of claim 1, wherein the first status and the second status are mutually exclusive.

10. A computer-implemented method comprising:
generating a first version of a graphical user interface, wherein the first version of the graphical user interface displays representations associated with a product in an instance in which the product is labeled with a first status, wherein the first version of the graphical user interface comprises a product information region comprising a set of information about the product and a first registration interface component, wherein the first registration interface component is displayed in a first predetermined location on the first version of the graphical user interface based at least in part on the first version of the graphical user interface being associated with the first status, wherein selection of the first registration interface component changes the first status to a second status;
generating a second version of the graphical user interface, wherein the second version of the graphical user interface displays the representations associated with the product in an instance in which the product is labeled with a second status, wherein the second version of the graphical user interface comprises the product information region including the set of information about the product and a second registration interface component, wherein the second registration interface component is displayed in a second predetermined location on the second version of the graphical user interface based at least in part on the second version of the graphical user interface being associated with the second status, wherein the first predetermined location and the second predetermined location do not occupy a same portion of the graphical user interface to prevent a user from mistakenly selecting the first registration interface component or the second registration interface component, wherein the first version of the graphical user interface does not have the second registration interface component, wherein selection of the second registration interface component changes the second status to a third status, wherein the second version of the graphical user interface does not have the first registration interface component;
receiving an input indicating a selection of the second status; and
selectively displaying the second version of the graphical user interface based at least in part on the selection of the second status, wherein selectively displaying the second version of the graphical user interface based at least in part on the selection of the second status comprises replacing the first version of the graphical user interface with a second version of the graphical user interface, the replacing causing deactivation of the first registration interface component such that the first registration interface component does not appear on the second version of the graphical user interface and the first registration interface component is not selectable on the second version of the graphical user interface.

11. The computer-implemented method of claim 10, wherein the product is labeled with the first status in an instance in which the product is registered in a first classification and the product is labeled with the second status in an instance in which the product is registered in a second classification.

12. The computer-implemented method of claim 11, further comprising:
receiving a user selection of the second registration interface component; and
in response to the user selection of the second registration interface component, causing the product to be registered in a third classification and unregistered from the second classification.

13. The computer-implemented method of claim 10, wherein the set of information about the product comprises official information about the product and purchase site information about the product.

14. The computer-implemented method of claim 13, wherein the product information region is displayed in a first location on the first version of the graphical user interface and the product information region is displayed in the first location on the second version of the graphical user interface.

15. The computer-implemented method of claim 13, wherein the official information about the product or the purchase site information about the product is generated using artificial intelligence.

16. At least one non-transitory computer-readable storage medium, the at least one non-transitory computer-readable storage medium having computer-executable program code portions stored therein, the computer-executable program code portions comprising program code instructions configured to:
generate a first version of a graphical user interface, wherein the first version of the graphical user interface displays representations associated with a product in an instance in which the product is labeled with a first status, wherein the first version of the graphical user interface comprises a product information region comprising a set of information about the product and a first registration interface component, wherein the first registration interface component is displayed in a first predetermined location on the first version of the graphical user interface based at least in part on the first version of the graphical user interface being associated with the first status, wherein selection of the first registration interface component changes the first status to a second status;
generate a second version of the graphical user interface, wherein the second version of the graphical user interface displays the representations associated with the product in an instance in which the product is labeled with a second status, wherein the second version of the graphical user interface comprises the product information region including the set of information about the product and a second registration interface component, wherein the second registration interface component is displayed in a second predetermined location on the second version of the graphical user interface based at least in part on the second version of the graphical user interface being associated with the second status, wherein the first predetermined location and the second predetermined location do not occupy a same portion of the graphical user interface to prevent a user from mistakenly selecting the first registration interface component or the second registration interface component, wherein the first version of the graphical user interface does not have the second registration interface component, wherein selection of the second registration interface component changes the second status to a third status, wherein the second version of the graphical user interface does not have the first registration interface component;
receive an input indicating a selection of the second status; and
display the second version of the graphical user interface based at least in part on the input indicating a selection of the second status by replacing the first version of the graphical user interface with the second version of the graphical user interface causing deactivation of the first registration interface component such that the first registration interface component does not appear on the second version of the graphical user interface and the first registration interface component is not selectable on the second version of the graphical user interface.

17. The computer-readable storage medium of claim 16, wherein the product is labeled with the first status in an instance in which the product is registered in a first classification and the product is labeled with the second status in an instance in which the product is registered in a second classification.

18. The computer-readable storage medium of claim 17, wherein the computer-executable program code portions further comprise program code instructions configured to:

receive a user selection of the second registration interface component; and in response to the user selection of the second registration interface component, cause the product to be registered in a third classification and unregistered from the second classification.

19. The computer-readable storage medium of claim 16, the set of information about the product comprises official information about the product and purchase site information about the product.

20. The computer-readable storage medium of claim 19, wherein the product information region is displayed in a first location on the first version of the graphical user interface and the product information region is displayed in the first location on the second version of the graphical user interface.

* * * * *